Figure 1:
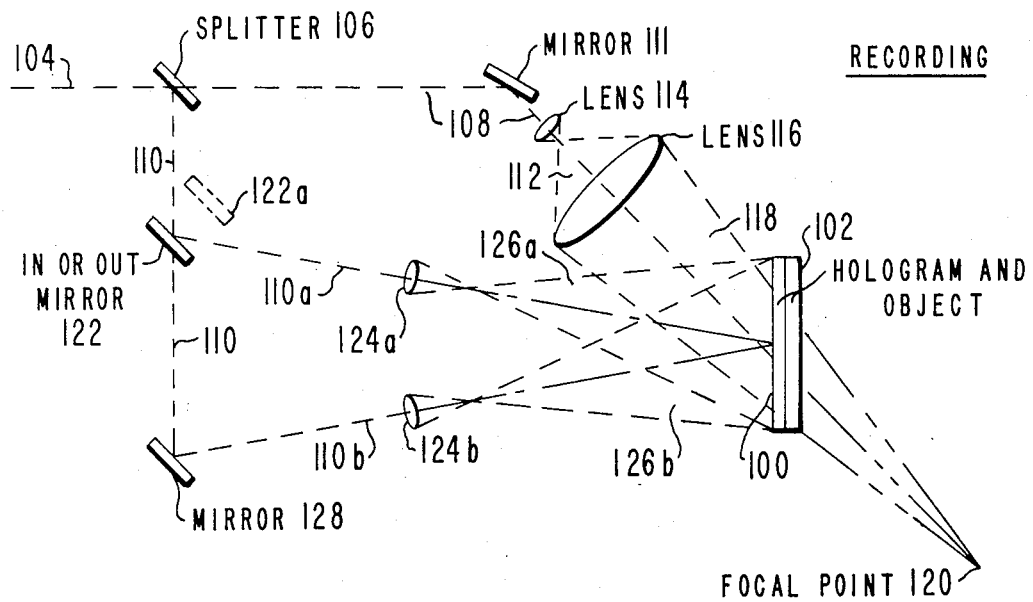

United States Patent [19]

Clay et al.

[11] 4,116,526

[45] Sep. 26, 1978

[54] DOUBLE MODULATION HOLOGRAPHIC RECORDING TECHNIQUE

[75] Inventors: Burton Ross Clay, Wayland; Gardner Thomas Burton, Danvers, both of Mass.

[73] Assignee: RCA Corporation, New York, N.Y.

[21] Appl. No.: 714,498

[22] Filed: Aug. 16, 1976

[51] Int. Cl.$^2$ ............................................... G02B 27/00
[52] U.S. Cl. .................................... 350/3.67; 350/3.76
[58] Field of Search .............................. 350/3.5, 162 R

[56] References Cited

U.S. PATENT DOCUMENTS

| 3,695,744 | 10/1972 | Clay | 350/3.5 |
| 3,820,869 | 6/1974 | Bolusset et al. | 350/3.5 |
| 3,924,925 | 12/1975 | Gale et al. | 350/3.5 |

OTHER PUBLICATIONS

Donig et al., "Übertragung von Stereophotographien Auf Ein Hologramm", *Optik*, vol. 37, No. 1, Jan. 1973, pp. 31–37.

Mikhail, "Hologrammetry: Concepts and Applications", *Photogrammetric Engineering*, Dec. 1974, pp. 1407–1422.

*Primary Examiner*—John K. Corbin
*Assistant Examiner*—John D. Lee
*Attorney, Agent, or Firm*—H. Christoffersen; Sameul Cohen; George J. Seligsohn

[57] ABSTRACT

By simultaneously illuminating an area of a hologram recording medium through an object transparency situated in substantially direct contact with the recording plane of the hologram recording plane with each of two angularly-displaced beams of coherent light, double modulation is achieved. The disclosed technique is particularly applicable to the serial recording on a single hologram of each of a stereo pair of object transparencies, which, on playback, provides a stereoscopic reconstructed image which is directly viewable by an observer.

5 Claims, 3 Drawing Figures

DOUBLE MODULATION HOLOGRAPHIC RECORDING TECHNIQUE

This invention relates to a "double" modulation holographic recording technique which is particularly suitable for recording a stereo pair of pictures on the same hologram, which then may be played back to provide a directly viewable reconstructed image that appears three dimensional to the observer.

Reference is made to U.S. Pat. No. 3,695,744, which issued Oct. 3, 1972 to B. R. Clay and is assigned to the same assignee as the present application. U.S. Pat. No. 3,695,744 discloses a holographic multicolored technique for recording and playing back focused (or quasi-focused) image type holograms which may be used to provide in an aircraft a colored aerial map display.

In the imaging system currently used to record a focused image type hologram of an object, such as a transparency, on a hologram recording medium, such as a photoresist, the optical path from the object to the recording plane is usually in the order of several inches to several feet. This gives rise to two possible sources of degradation in the recorded hologram. First, the optical path through the air tends to be turbulent, which reduces fringe contrast in direct proportion to the volume of the path. Minimizing this turbulence requires the use of a holographic table with a draft-reducing enclosure. Second, is that the holographic table itself provides a path through the structure supporting the object and the recording medium which allows vibrational movement through the coupling between the object and the recording plane fixtures. Since the longer the path distances between the object and the recording plane, the greater the possibility of unequal phase coupling, large holographic tables are particularly vulnerable to this effect.

Under current hologram recording practice, only the object beam of light is modulated with picture information, while the reference beam of light remains unmodulated. This limits the obtainable dynamic range (contrast) of the relative intensities from point to point of the pictorial information manifested by the hologram reconstructed image to an amount equal to or even less than that of the pictorial information on the object transparency itself. This becomes important if the object transparency has a dynamic range which is materially smaller than possible in the hologram reconstructed image. For instance, for aerial map displays, the pictorial information recorded as a hologram is normally originally obtained from an aerial reconnaissance photographic transparency. Often, the dynamic range of the pictorial information of an aerial reconnaissance photographic transparency is relatively small compared to that possible in the reconstructed image from a hologram.

For such uses as an aerial map display, it would be desirable to originally take aerial reconnaissance photographs with a stereoscopic (binocular) camera to provide a "left" and "right" transparency pair of an aerial scene, and then employ this transparency pair as objects to record a hologram which, on playback, provides a reconstructed image that may be binocularly directly viewed by an observer as a 3-D (stereoscopic) representation of the aerial scene.

The present invention provides a holographic recording technique which, besides avoiding the shortcomings discussed above of conventionally recorded focused image type holograms, has the additional benefit of being compatible with the recording of the picture information in a stereo pair of transparencies on the same single hologram. Briefly, in accordance with the principles of the present invention, a transparency object to be holographically recorded is placed in direct contact with the holographic recording medium (preferably a photoresist) so that the optical length between the transparency and the recording plane is reduced to substantially zero. Then, the given surface area of the holographic recording medium is simultaneously exposed to first and second angularly-displaced, mutually-coherent light beams which have conjugate wavefront shapes. Both of these beams pass through and are modulated by the object transparency in contact with the surface of the hologram recording medium. If desired, the hologram recording medium may then be simultaneously exposed a second time, using a second different object transparency, with the aforesaid first beam of light together with a third beam of light (which replaces the second beam of light) having the same wavefront shape as the second beam of light. However, the third beam of light is angularly displaced from the first beam of light by a different angular displacement from that of the second beam of light. If the respective object transparencies employed during each of the first and second exposures of the hologram recording medium correspond respectively to the "left" and "right" transparencies of a stereo pair and the difference in the angular displacements, with respect to the first light beam, of the second and third light beams corresponds with the distance between the two eyes of an observer, playback of such a recorded hologram results in a reconstructed image which is directly viewable by an observer as a 3-D representation of the pictorial scene information contained in the stereo pair of transparencies. Of course, more than two serial exposures of the hologram recording could be made without departing from the principles of the present invention.

Figure 2:
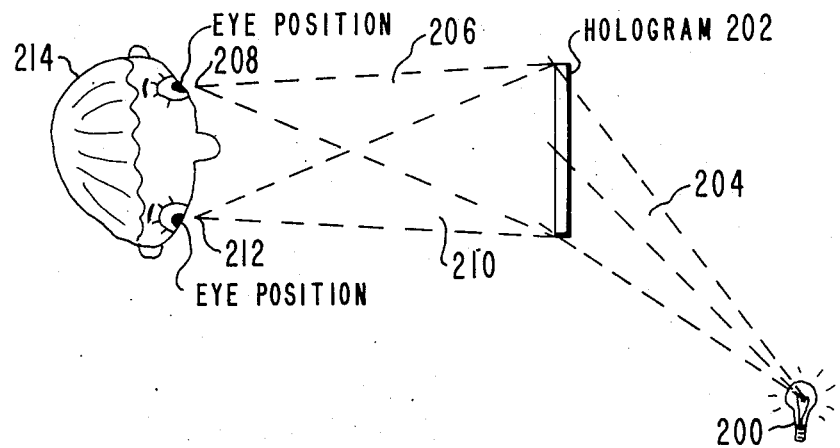
Figure 3:
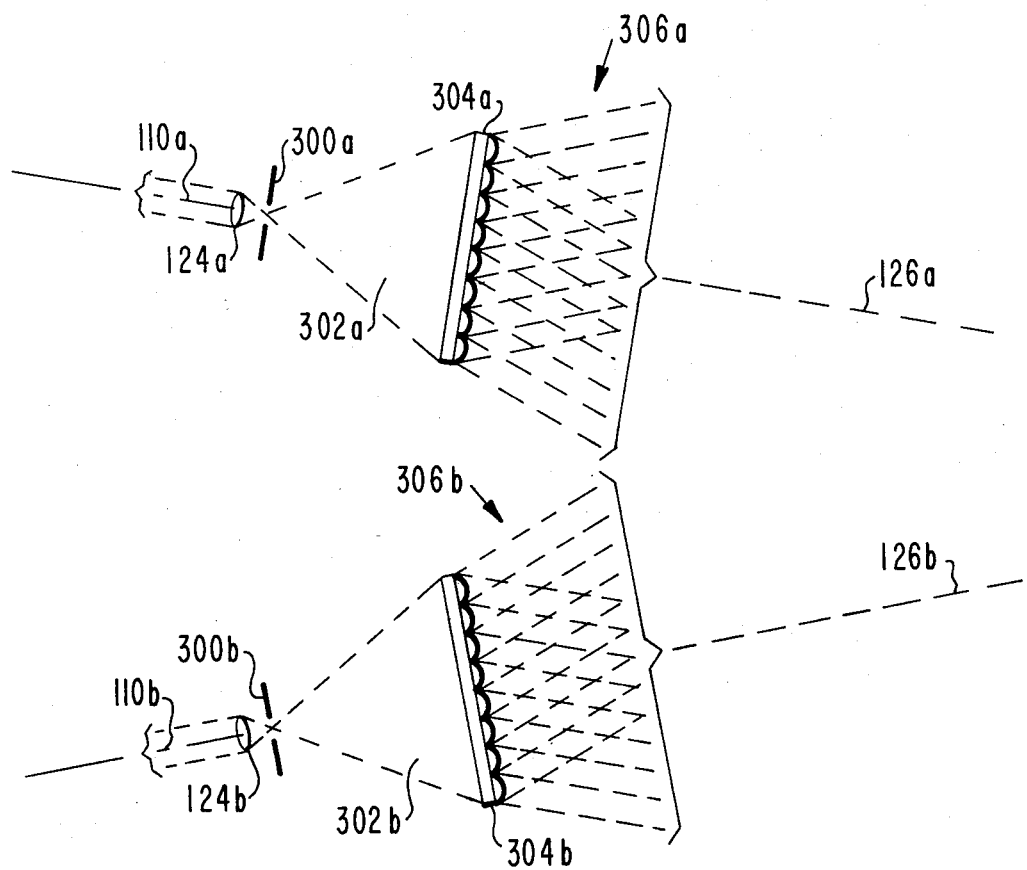

In the drawing:

FIG. 1 shows an arrangement for recording a hologram embodying the principles of the present invention;

FIG. 2 shows an arrangement for playing back a recorded hologram that embodies the principles of the present invention to provide a reconstructed image which may be binocularly directly viewed by an observer as a 3-D representation, and FIG. 3 shows a modification of the hologram recording arrangement of FIG. 1 which, on playback, permits greater eye freedom for an observer in directly viewing the hologram reconstructed image.

Referring now to the recording arrangement shown in FIG. 1, a transparency 100 of the picture information to be holographically recorded is placed in substantial contact with the surface of a holographic recording medium 102, which is preferably a photoresist. The beam of coherent light 104, derived from a source such as a laser (not shown), is incident on a beam splitter 106. Beam splitter 106 divides incident beam 104 into component beams 108 and 110. Component beam 108, after reflection from mirror 111, is transferred into divergent light beam 112 by microscope lens 114. Divergent beam 112 is incident on lens 116 which transfers divergent light beam 112 into convergent light beam 118 that has its focus at focal point 120. Situated as shown in FIG. 1 in the path of convergent light beam 118 is object transparency 100 in contact with the surface of hologram recording medium 102, which intercepts substantially all the light in convergent light beam 118 (so that substantially little, if any, of the light in light beam 118 actually reaches focal point 120). Convergent light beam 118 has some certain wavefront shape (curvature) in the recording plane of hologram recording medium 102.

"In or Out" mirror 122 may be moved from its "In" position (in the path of light beam component 110 from splitter 106) to its "Out" position by such means as a solenoid (not shown). When mirror 122 is in its "In" position (as shown in FIG. 1) light beam component 110 is reflected therefrom to provide light beam 110a. In the path of light beam 110a is microscope lens 124a, which transfers light beam 110a into divergent light beam 126a, which is intercepted by object transparency 100 and hologram recording medium 102, as shown in FIG. 1. Microscope lens 124a has a focal length and a spacing from hologram recording medium 102 selected to provide a wavefront shape (curvature) of divergent light beam 126a at the recording plane of hologram recording medium 102 which is substantially the conjugate of the certain wavefront shape (curvature) of convergent light beam 118 at the recording plane of hologram recording medium 102. In this manner, a first holographic portion of the hologram, of the object information defined by the transparency 100 then present, is recorded on the surface of hologram recording medium 102.

For purposes of describing the present invention, it is assumed that the object information defined by the transparency 100 present during the recording of the first holographic portion of the hologram, while mirror 122 is in its "In" position, with light beams 118 and 126a, is the "left" picture information transparency of a given stereo pair. After the first exposure of hologram recording medium 102 with light beams 118 and 126a to record the first holographic portion of the hologram, mirror 122 is moved from its "In" position to its "Out" position 122a and the object transparency is changed so that now object transparency 100 is assumed to be the "right" picture information transparency of the given stereo pair.

With mirror 122 moved to its "Out" position 122a, light beam component 110 continues on until it is reflected by mirror 128 to provide light beam 110b, as shown in FIG. 1. Microscope lens 124b in the path of light beam 110b transfers light beam 110b into divergent light beam 126b, which is intercepted by transparency 100 and hologram recording medium 102. The focal length of microscope lens 124b and its distance from the recording plane of hologram recording medium 102 are selected to provide a wavefront shape (curvature) for divergent light beam 126b in the recording plane of hologram recording medium 102 which is substantially the conjugate of the certain wavefront shape (curvature) of divergent light beam 118 in the recording plane of hologram recording medium 102. In this manner, a second holographic portion of the hologram is recorded on top of the previously recorded first holographic portion thereof.

Hologram recording medium 102, which is assumed to be a photoresist, after development manifests the recorded hologram (the superposition of the first and second holographic portions) as a surface relief pattern. This surface relief pattern may be employed as a master recording to derive embossed replicas, each of which comprises a surface relief pattern in the surface of a plastic medium, such as vinyl, as is known in the art.

Referring now to FIG. 2, there is shown an arrangement for playing back the recorded hologram (or a replica thereof). A point source of light, such as incandescent lamp 200, situated at a point which corresponds to focal point 120, illuminates recorded hologram 202 with readout beam of light 204. Since each of the two holographic portions recorded in FIG. 1 are essentially of the focused image type, the light from source 200 need not be coherent, and may be white light or light of a particular color hue. (The present invention may be combined with the teachings of the aforesaid U.S. Pat. No. 3,695,744 to produce 3-D color aerial maps.) In any case, one of the first diffraction orders of light 206 of the first recorded holographic portion emerging from hologram 202 reconstructs an image of the object transparency employed during the recording of the first holographic portion. The first diffraction order light 206 converges to a point 208 corresponding to the focal point of microscope lens 124a in FIG. 1. In a similar manner, one of the first diffraction orders of light 210 of the recorded second holographic portion reconstructs an image of the object transparency 100 employed during the recording of the second holographic portion. The first diffraction order light 210 converges to point 212 corresponding to the focal point of microscope lens 124b in FIG. 1. If, as has been assumed, the holographically recorded object information comprises a stereo pair, an observer 214 having the pupil of his left eye substantially at convergence point 208 and the pupil of his right eye substantially at convergence point 212 receives a 3-D image of the pictorial information in the stereo pair located substantially in the plane of hologram 202.

Thus, the present invention, as disclosed in FIGS. 1 and 2, makes it possible for an observer to directly view a 3-D reconstructed image of a holographically recorded stereo pair. However, in doing so the observer is required to keep his eyes substantially at convergence points 208 and 210. This disadvantage is overcome with the modification to the recording arrangement of FIG. 1 shown in FIG. 3, which, on playback, provides substantially greater eye freedom for the observer.

The copending patent application Ser. No. 714,360 of Clay et al., filed Aug. 16, 1976, entitled "Hologram Recording Technique" and assigned to the same assignee as the present invention, discloses an improved technique for recording a hologram of an object which, on playback, permits the reconstructed image of the object to be directly viewed over an expanded image viewing area. This increases the eye freedom of the observer. The modification to the hologram recording arrangement of FIG. 1 shown in FIG. 3 incorporates the invention disclosed in the aforesaid copending patent application Ser. No. 714,360. In particular, as shown in FIG. 3, a pinhole mask 300a is placed in the back focal plane of microscope lens 124a and a pinhole mask 300b is placed in the back focal plane of microscope lens 124b. A divergent light beam 302a emerges from pinhole mask 300a and a divergent light beam 302b emerges from pinhole mask 300b. Placed in the path of divergent light beam 302a at a selected distance from pinhole mask 300a is lenticular array 304a, which subtends a sufficiently large area to provide relative eye freedom for the observer on playback. In a similar manner, lenticular array 304b is placed in the path of divergent beam 302b. Each of lenticular arrays 304a and 304b comprises a plurality of contiguous lenticules having a pitch such as one per millimeter. Each of the individual lenticules of lenticular arrays 304a and 304b may have a focal length such as three millimeters. The plurality of spaced divergent light beams 306a formed by lenticular array 304a comprise light beam 126a of FIG. 1. In a similar manner, the plurality of spaced divergent light beams 306b formed by lenticular array 304b comprise light beam 126b of FIG. 1. The hologram recorded with the arrangement of FIG. 1 as modified in FIG. 3, on playback, provides a reconstructed image which may be directly viewed by an observer having the pupil of his left eye positioned at any point within a first region comprising an expanded area surrounding convergence point 208 and having the pupil of his right eye positioned at any point within a second region comprising an expanded area surrounding divergence point 212 of FIG. 2. This provides appreciably more eye freedom for the observer in viewing the reconstructed image than is the case of a hologram recorded by the arrangement of FIG. 1. without the modification of FIG. 3.

What is claimed is:

1. A holographic recording method for enhancing the dynamic range of pictorial information manifested by an object transparency exhibiting relatively small dynamic range, where "relatively small dynamic range" is defined as a dynamic range which is materially smaller than that possible in a reconstructed image of a directly-viewable recorded hologram; said method comprising a step of:

simultaneously illuminating an area of a recording plane of a hologram recording medium through a relatively-poor dynamic range object transparency situated in substantially direct contact with said area with each of first and second beams of mutually coherent light, said first and second beams having a given angular displacement with respect to each other, said first beam having a certain non-plane wavefront shape in the recording plane of said hologram recording medium, said second beam having a wavefront shape in the recording plane of said hologram recording medium shape in the recording plane of said hologram recording medium which is substantially the conjugate of said certain non-plane wavefront shape.

2. The method defined in claim 1, including a further step of:

thereafter simultaneously illuminating said area through a relatively-small-dynamic range object transparency situated in substantially direct contact with said area with said first beam and a third beam of light that is mutually coherent with said first beam, said first and third beams having a second given angular displacement with respect to each other which is different from said first-mentioned given angular displacement, said third beam having a wavefront shape in the recording plane of said hologram recording medium which is substantially the conjugate of said certain wavefront shape, whereby said second and third beams have substantially the same wavefront shape.

3. The method defined in claim 2, including a step occurring between said first-mentioned and said second-mentioned steps of:

replacing a first object transparency present during the occurrence of said first-mentioned step with a different second object transparency, which second object transparency remains present during the occurrence of said second-mentioned step.

4. The method defined in claim 3, wherein said first object transparency manifests the object information in one of a stereo pair of object transparencies and said second object transparency manifests the object information in the other of said stereo pair of object transparencies, wherein said first beam is a converging beam converging toward a focal point situated beyond said recording plane, wherein said second beam is a diverging beam diverging from at least a first point within a first region, and wherein said third beam is a diverging beam diverging from at least a second point within a second region separated from said first point within said first region by a distance preselected to substantially correspond with the spacing between the left and right eyes of an observer directly viewing a reconstructed image of a hologram recorded by said method.

5. A recorded hologram capable of reconstructing a directly viewable enhanced dynamic range stereoscopic image, said recorded hologram having been recorded by a method including the steps of:

simultaneously illuminating an area of a recording medium through a first object transparency situated in substantially direct contact with said area with each of first and second beams of mutually coherent light, said first object transparency manifesting the object information in one of a stereo pair of object transparencies, said first and second beams having a first given angular displacement with respect to each other, said first beam being a converging beam converging toward a focal point situated beyond said hologram recording medium and having a certain wavefront shape in the recording plane of said hologram recording medium, and said second beam being a diverging beam diverging from at least a first point within a first region and having a wavefront shape in the recording plane of said hologram recording medium which is substantially the conjugate of said certain wavefront shape;

then replacing said first object transparency with a second object transparency situated substantially in direct contact with the recording plane of said hologram recording medium, said second object transparency manifesting the object information in the other of said stereo pair of object transparencies, and thereafter simultaneously illuminating said area through said second object transparency with said first beam and a third beam of light that is mutually coherent with said first beam, said first and third beams having a second given angular displacement with respect to each other which is different from said first given angular displacement, said third beam being a diverging beam diverging from at least a second point within a second region separated from said first point within said first region by a distance preselected to substantially correspond with the spacing between the left and right eyes of an observer directly viewing a reconstructed image of said recorded hologram, and said third beam having a wavefront shape in the recording plane of said hologram recording medium which is substantially the conjugate of said certain wavefront shape.

* * * * *